W. M. GALLOWAY.
COMPRESSED AIR FEED FOR AUTOMOBILES.
APPLICATION FILED SEPT. 1, 1920.
1,419,553.
Patented June 13, 1922.
2 SHEETS—SHEET 2.
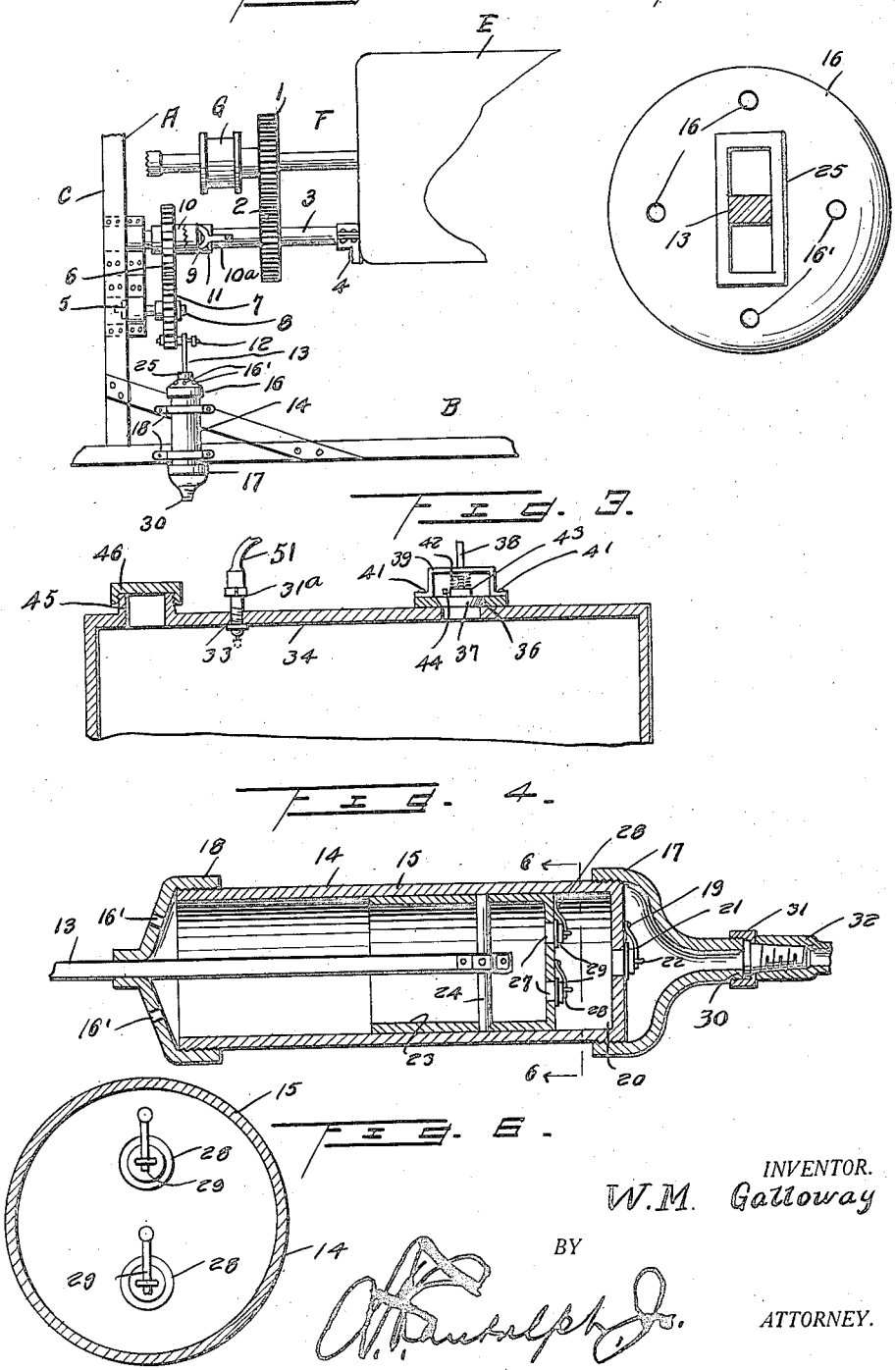
INVENTOR.
W.M. Galloway
BY
ATTORNEY.

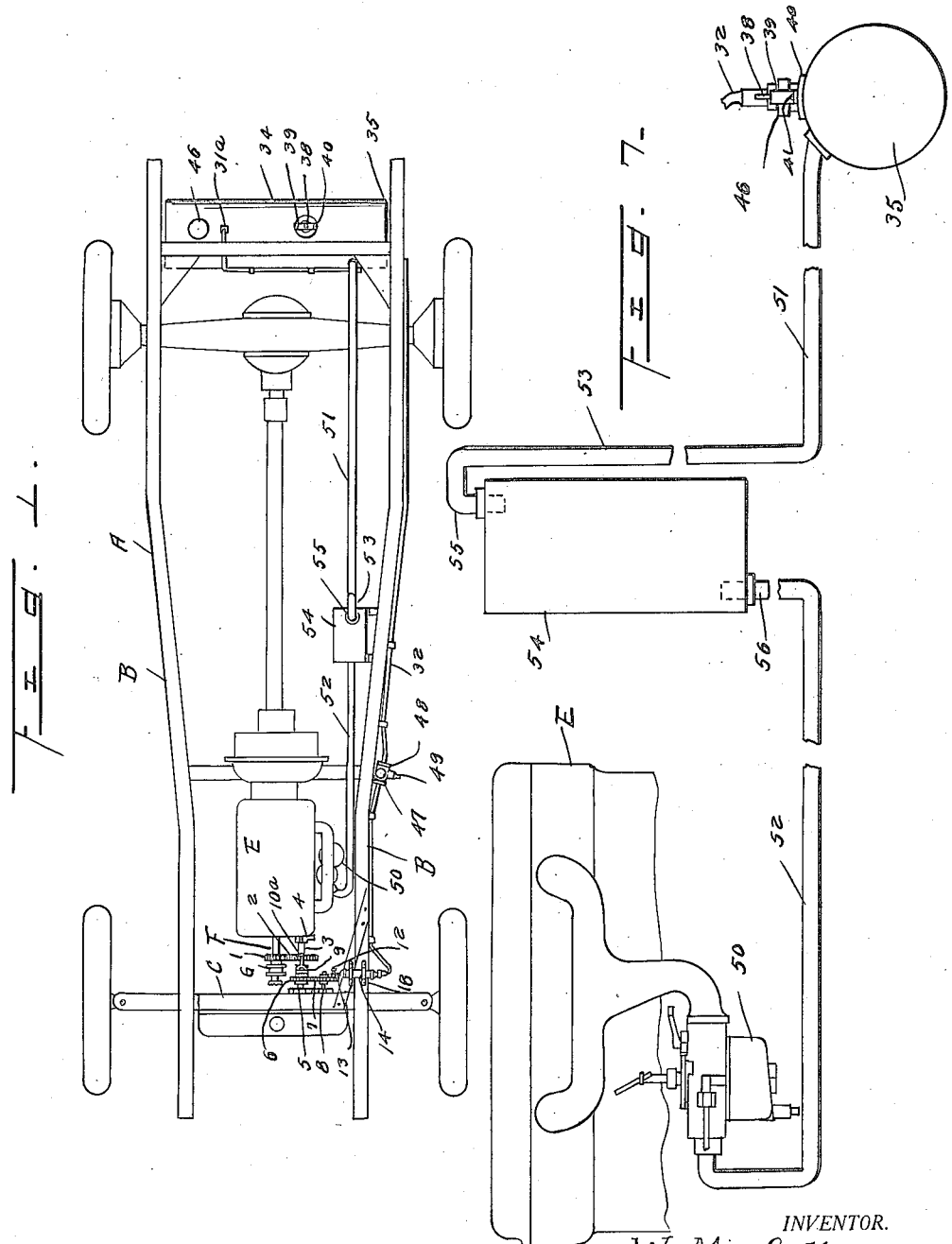

UNITED STATES PATENT OFFICE.

WILLIAM M. GALLOWAY, OF VERA, TEXAS.

COMPRESSED-AIR FEED FOR AUTOMOBILES.

1,419,553. Specification of Letters Patent. Patented June 13, 1922.

Application filed September 1, 1920. Serial No. 407,322.

*To all whom it may concern:*

Be it known that I, WILLIAM M. GALLOWAY, a citizen of the United States, residing at Vera, in the county of Knox and State of Texas, have invented certain new and useful Improvements in Compressed-Air Feeds for Automobiles; and I do hereby declare the following to be a full, clear, and exact description of the invention, such as will enable others skilled in the art to which it appertains to make and use the same.

This invention relates to compressed air feeds for automobiles, and more particularly to a system whereby the gasoline will be fed to the carbureter of the engine of an automobile by air pressure so as to insure a proper supply of fuel to the engine at all times.

One of the main objects of the invention is to provide means whereby the gasoline may be fed to the engine of an automobile by air pressure, thus insuring proper feed of the fuel even when the supply in the tank is very low or if the vehicle is going up hill.

The invention has for a further object the provision of a compressed air feed of the character stated in which will be included an auxiliary gravity feed gasoline tank from which the gasoline may be fed for starting the engine without the necessity of first pumping the gasoline from the main tank.

The invention has for a further object the provision of air compressing means for supplying air under pressure to the tank, the compressing means being also capable of being used for inflating the tires of the automobile, and for similar purposes.

With the foregoing and other objects in view as will appear as the description proceeds, the invention consists in the novel construction, combination and arrangement of cooperating elements as hereinafter more specifically set forth, shown in the accompanying drawings and claimed.

In the drawings forming a part of the present application;

Figure 1 is a top plan view showing diagrammatically a system applied in accordance with my invention.

Figure 2 is an enlarged top plan view of the air compressor or pump and the operating means therefor.

Figure 3 is a detail sectional view through the gasoline tank.

Figure 4 is a central horizontal longitudinal section through the pump.

Figure 5 is an inner end view of the pump.

Figure 6 is a section taken substantially on line 6—6 of Figure 4.

Figure 7 is a detail view showing the auxiliary gasoline tank and the connection thereof with the sectional pipe leading from the main gasoline pipe to the carbureter of the engine.

Referring more in detail to the drawings in which similar reference characters designate corresponding parts throughout the several views, A indicates in general an automobile frame which may be of any suitable or standard construction provided with the side sills B and the radiator supporting frame C. The engine E, which may also be of any suitable construction, is of the usual type being provided with the shaft F upon which is secured the fan belt pulley C. The construction of the various parts so far referred to may be of any desired or suitable type, and these parts form no part of my invention except in so far as they cooperate with the means to be hereinafter described to accomplish the desired result.

A gear 1 is secured on shaft F and meshes with a gear 2 which is secured on a countershaft 3, the inner end of which is rotatably supported in a bearing member 4 secured to the casing of engine E. The forward end portion of shaft 3 is rotatably supported in a bearing bracket 5 which depends from the radiator supporting frame C and is rigidly secured thereto. A spur-gear 6 is loosely mounted on shaft 3 adjacent the bearing bracket 5 and meshes with a similar gear 7 which is rotatably mounted on a stub shaft 8, this stub shaft being also carried by the bearing bracket 5. Gear 7 is preferably provided with suitable anti-friction bearings so as to reduce friction to the minimum, this bearing including bearing cones which may be adjusted longitudinally of the stub shaft so as to insure proper registering of the two gears. A clutch member 9 is feathered on shaft 3 for movement into and out of engagement with a clutch member 10 formed on the inner face of gear 6. This clutch member 9 is actuated by a rod 10ª connected thereto by means of a fork 11, this rod being preferably extended to a position on the dash of the automobile, or in any other position where it is easily accessible to the driver. By means of the clutch the gear 9 may be readily thrown into and out of operation so as to optionally cause rotation of gear 7.

Gear 7 is provided with an eccentrically disposed connecting pin 12 which projects a considerable distance beyond the inner face of the gear, this pin being inserted through the inner end of a connecting rod 13 of an air compressor or pump designated generally by the numeral 14. This pump comprises a cylindrical barrel 15 on the inner end of which is secured a closure cap 16, a similar cap 17 being secured on the outer end of the barrel. The barrel receives securing clamps 18 which are secured tightly about the same and to sill B and corner brace B', the pump being thus secured firmly in position on the frame. As will be noted more clearly from Figure 4, the outer end of barrel 15, which is provided with the outer end disk 19, is provided with an air outlet opening 20 over which fits a flap valve 21 normally held in seated position by a wire spring 22 secured thereto and to the disk 19. This valve acts to permit air to escape from within the pump cylinder into the head or cap 17 while effectually preventing this air from flowing back into the barrel. A hollow cylindrical piston 23 fits snugly the interior of barrel 14 and is operatively connected to the connecting rod 13 by means of a cross pin 24, as illustrated. This rod 13 fits snugly in a vertically disposed substantially rectangular neck 25 formed integrally with and projecting inwardly from the inner end cap 16, this neck serving to guide the rod during its vertical movement while permitting proper movement thereof for reciprocation of the piston. It is also to be seen that the inner end cap 16 is provided with suitable air passages or openings 16'. The inner end of piston 23 is open, the outer end being provided with a closure disc 26 through which are formed the air inlet openings 27, normally closed by valve 28 held in seated position by a wire spring 29 secured thereto and to disk 26. As will be understood, when gear 8 is rotated, the pump 14 will be operated so as to compress air and force it through the air escape opening 20 into the cap 17, air flowing through the opening 27 into the outer portion of barrel 15 on the inward stroke of the piston, this air being expelled from the barrel and forced into cap 17 on the outward stroke.

The closure cap 17 at the outer end of the pump is provided with a reduced exteriorly threaded nipple 30 adapted to receive an exteriorly threaded hose coupling 31, by means of which a flexible hose length 32 may be connected to an air inlet valve 33 secured to the top 34 of a gasoline tank 35 mounted on the vehicle. This valve 33 is also provided with an exteriorly threaded neck or stem which receives a coupling member 31ª at the other end of the base. The tank 35 is further provided with a valve seat 36 positioned on its upper face, which receives a frusto-conical valve 37, the stem 38 of which projects outwardly through a spider 39 having outturned flanges secured at 41 upon the valve seat 36, as shown in Figure 3 of the drawings. A suitable spring 42 is engaged around the stem 38 within the spider 39 and has one end adapted to bear against the latter while its opposite end bears against a collar 43 which is adjustably mounted on the stem 38 between the spring 42 and the valve 37 and adapted to be secured in adjusted position by a suitable set screw 44 or the like. It will be understood that the spring 42 is an expansion spring and assists to normally retain the valve 37 in seated position upon the valve seat 36. By adjustment of the collar 43, the tension of the spring 42 may be readily regulated so as to permit unseating of the valve 37 when the desired air pressure is attained within the air tank 35. Valve 37 thus constitutes a safety relief valve which will act to automatically retain air within the tank at a substantially predetermined pressure of the pump in its operation. The tank 35 is further provided with the usual filling nipple 45, upon the upper end of which is threaded a closure cap 46, the usual air opening being omitted in said cap to insure that the tank will be closed air tight.

A suitable coupling 47 is provided in the path of the air conducting pipe 32 or flexible hose length and said coupling 47 is in the form of a valve chamber having a three way valve 48 located therein. A hose connection 49 is also formed on the branch of the coupling member 47 so that a hose section may be connected therewith for the purpose of inflating the tires of the automobile or for attaining air under pressure to the flexible hose length 32 for some other purpose, if desired. It will be understood that the three way valve 48 is of conventional form and when in one position will form communication with the connected sections of the flexible hose section or air line 32 so that the air from the pump 14 may pass into the gasoline tank 34. When the valve 48 is in its other position, the air from the pump 14 will be caused to pass into the hose connection 49, as will be evident by those familiar with this art.

A gasoline conducting pipe leading from the tank 34 to the carbureter of the engine E is formed in two sections designated by the numerals 51 and 52, respectively. The sections 51 extend from the gasoline tank 34 with which it is connected by one end, while its opposite or remaining end is turned upwardly, as shown at 53 and then curved downwardly and extended into the auxiliary gasoline tank 54, as shown at 55. The end 55 of the pipe 51 extends into the upper end of the tank 54, as clearly shown in Figure 7 of the drawings. By referring to this Figure it will also be seen that the end 56 of the pipe section 52 extends downwardly from the bottom of the auxiliary gasoline tank 54 and then through the carbureter 50 of the engine E, as previously stated. It will therefore be seen that the auxiliary gasoline tank 54 is on a horizontal plane above the horizontal plane of the carbureter 50 of the engine E, whereby a gravity feed may be obtained from the auxiliary gasoline tank 54, to the engine carbureter 50, as is particularly desirable when starting the engine as there may not be sufficient air pressure within the gasoline tank 34.

In practice, the control clutch will be moved in such position as to normally cause operation of the pump, thus maintaining the air pressure within the tank 35 at a predetermined point so as to force the gasoline from this tank through the feed pipe to the carbureter at a regular rate of speed, thus insuring more uniform operation of the engine. Also, in the event that the gasoline within the tank is rather low and the vehicle is going up a steep incline, the air will act to insure at all times, proper feed of gasoline to the carbureter, thus avoiding the difficulty of lack of proper feed of fuel, which is frequently encountered in tanks not provided with a pressure supply means when climbing steep hills and the gasoline within the tank is low. In addition, when desired, the flexible tubes 32 may be detached from the nipple 30 of closure flap 17 so as to permit the pump to be connected to the inflating valve of a tire for inflating the same or, if preferred, the tube 32 may be detached from valve 33 which may be of the same type as a tire valve, and connected to the valve of a tire to be inflated, after which the pump may be operably connected to the shaft 3 through the medium of the control clutch so as to cause operation of the pump for inflating the tire.

It will be evident that there may be slight changes made in the construction and arrangement of the different parts of my invention without departing from the field and scope of the same, and I intend to include all such variations, as fall within the scope of the appended claims, in this application in which a preferred form only of my invention is disclosed.

What is claimed is:—

1. In an automobile fuel supply system having a fuel supply tank and a pipe to lead compressed air thereto, a three-way valve in the pipe operable selectively to permit the supply of compressed air to the tank or convert it to another source of use.

2. In an automobile fuel supply system having a fuel supply tank and a pipe to lead compressed air thereto, a three-way valve in the pipe operable selectively to permit the supply of compressed air to the tank or convert it to another source of use, and a normally closed valve between the three-way valve and tank for opening through pressure of compressed air passing to the tank.

In testimony whereof I affix my signature in presence of two witnesses.

WILLIAM M. GALLOWAY,

Witnesses:
D. F. Goss,
Van Hillman.